Figure 2:
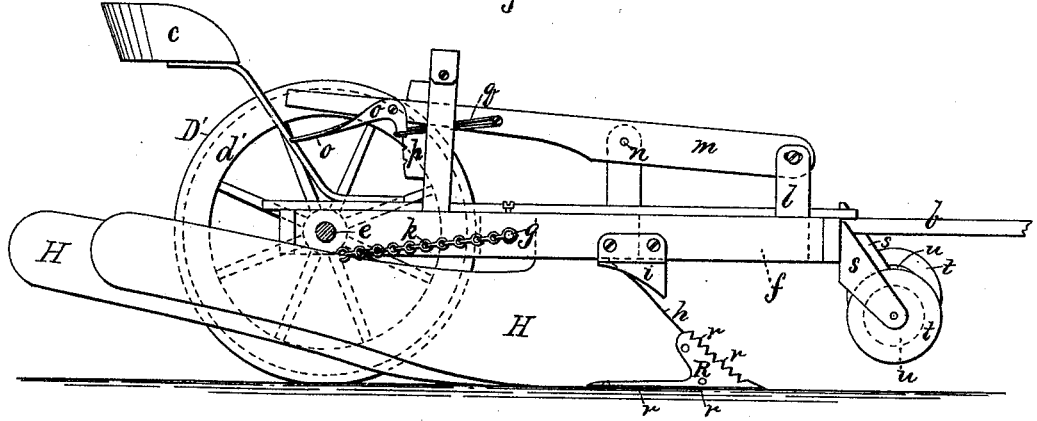

2 Sheets—Sheet 1.

T. E. JEFFERSON.
Sulky-Plow.

No. 214,396.   Patented April 15, 1879.

Witnesses:
Henry Chadbourn
Elerton L. Dorr

Inventor:
Thomas E. Jefferson
by Alvan Andrew
his atty.

N. PETERS, PHOTO-LITHOGRAPHER, WASHINGTON, D.C.

T. E. JEFFERSON.
Sulky-Plow.

No. 214,396. Patented April 15, 1879.

Witnesses:
Henry Chadbourn.
Ellerton L. Dorr.

Inventor:
Thomas E. Jefferson
by Alban Andrew
his atty.

UNITED STATES PATENT OFFICE.

THOMAS E. JEFFERSON, OF BOSTON, MASSACHUSETTS.

IMPROVEMENT IN SULKY-PLOWS.

Specification forming part of Letters Patent No. 214,396, dated April 15, 1879; application filed October 28, 1878.

*To all whom it may concern:*

Be it known that I, THOMAS E. JEFFERSON, of Boston, in the county of Suffolk and State of Massachusetts, have invented certain new and useful Improvements in Sulky-Plows; and I do hereby declare that the following is a full, clear, and exact description thereof, which will enable others skilled in the art to which it appertains to make and use the same, reference being had to the accompanying drawings, and to letters of reference marked thereon, which form a part of this specification.

Heretofore wheel or sulky plows have been provided with one or more wheels immediately following the plow or plows in the furrows, and also with one wheel following the plow in the furrow and another traveling upon the newly-plowed land. Others have been arranged to have one wheel traveling in the open furrow last plowed and the other upon the unplowed land. Still another has two wheels in the furrow, but with the furrow-side wheel set in advance of the land-side wheel. The first of these methods is objectionable, because when using one or two plows it does not give the bearing-wheels sufficient breadth of tread to run steady, and also because if using more than one plow the furrow-side wheel is directly in the way of the soil being inverted by the mold-board of a land-side plow. The second and third of these methods are objectionable on account of the unevenness of the sulky at times while in use; or if the furrow-wheel is made larger than the other, or the axle is constructed specially with a view of keeping the sulky level while in use, then because of the increased labor and trouble of continually changing the adjustment of the axle, and also because of the great power required for running over newly-plowed or rough unplowed land.

The last-named method of arranging the wheels has been found impracticable on account of the difficulty experienced in turning the implement while in the furrow without liability of breaking one or both of the wheels, or even upon smooth ground without dragging one or other of the wheels laterally.

The main feature of my improvement consists in supporting one or more more plows by running a furrow or bearing wheel immediately behind the land-side plow in the furrow in connection with another bearing-wheel in the same transverse line with the land-side wheel, and running in the open furrow left by the plow in its previous trip across the field, thereby widening the tread of the wheels and making the implement run even, level, and steady and with the lightest possible draft, while at the same time it may be turned while either in or out of the furrow with the greatest ease, like the ordinary sulky. If using one plow the bearing-wheels are spread to run in two adjacent furrows—that is, one in the open furrow and the other in the land-side furrow, or that being formed. If using two plows the bearing-wheels will be spread to run in the first and third furrows. If using three plows the bearing-wheels are spread to run in the first and fourth furrows, and so on for any number of plows.

The wheels can be run upon one axle or upon separate axles. The length of the mold-board or mold-boards will be such as to extend back far enough and incline sidewise sufficiently in the open furrow behind the furrow side bearing-wheel to embrace the entire space between the wheels and invert the soil in rear of the furrow-side wheel, and the mold-board is braced by a chain extending from the rear end thereof to the fulcrum-bar, around which it swings.

The beam of each plow is movable around a fulcrum located near the center of gravity of the plow and its mass of soil upon it, and is connected with an approximately horizontal lever extending rearwardly, by which the plow can easily be manipulated by the driver bearing his weight downward upon it, thus raising or lowering the point of the plow, as may be desired, according to the amount of depth that is to be penetrated. On the operating-lever is arranged a locking device, by means of which the plow can be firmly held in any desired position, and said lever is hung on a fulcrum and jointed in its forward end to an upright-projecting rigid bar attached to the forward end of the beam. The locking device above named is made self-locking as soon as the operator lets go the hold of the lever.

For the purpose of automatically cutting away grasses and stalks that accumulate at the upper forward end of the plowshare, I employ a cutting device consisting of a stationary cutting knife or blade, secured stationary to the frame, and I make the upper end of the plowshare sharp, so as to form as it were a pair of shears, the stationary knife constituting one blade thereof, and the movable sharp upper part of the plowshare constituting the other blade, the latter being moved to and from the other by means of the lever and connecting mechanism to the beam of the plow that is thus made to swing on its fulcrum, as heretofore described.

One or more plows may be used, according to circumstances. If one plow only is used I make the furrow-wheel adjustable on its axle and slide it laterally toward the frame, so as to locate the said wheel in such a manner on its axle that it will run in the first furrow.

Figure 1:
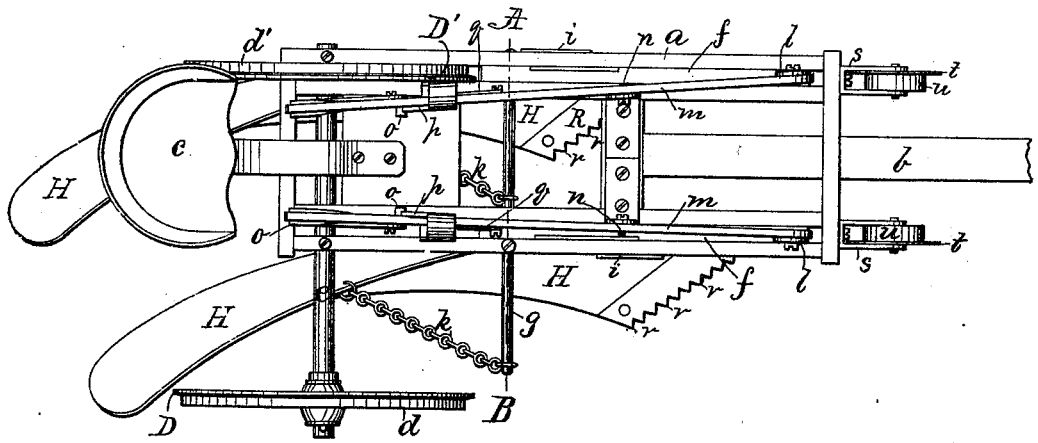
Figure 4:
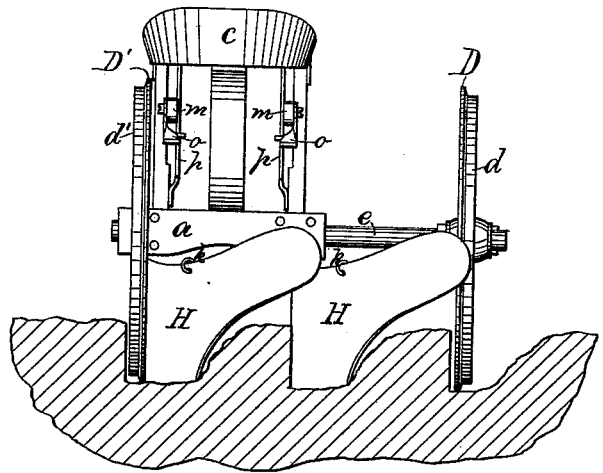
Figure 3:
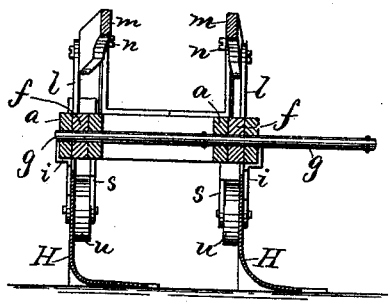

On the accompanying drawings, Figure 1 represents a plan view of my improved plow. Fig. 2 represents a side elevation of the same. Fig. 3 represents a cross-section on the line A B, (shown in Fig. 1,) and Fig. 4 represents a rear view.

Similar letters refer to similar parts wherever they occur on the different parts of the drawings.

$a$ $a$ represent the frame, and $b$ the pole to which the draft-animals are attached. $c$ is the driver's seat, and $d$ $d'$ are the supporting-wheels, with their annular flanges D D', movable around one and the same axle $e$.

$f$ is one of the plow-beams hinged and supported on the fulcrum-bar $g$, around which it can move in a vertical direction.

H is the mold-board, with its upper sharp cutting-edge, $h$, secured to the beam $f$. $i$ is the stationary part of the shear, secured to the frame of the plow. $k$ is a chain, extending from the rear end of the mold-board to the fulcrum-bar $g$, for the purpose of securing the mold-board firmly in place to said fulcrum-bar, around which it swings. $l$ is a rigid bar extending upward from the front end of the plow-beam, the upper end of which rigid bar is jointed to the forward end of the lever $m$, as shown in Fig. 2. The lever $m$ is made to move on the fulcrum $n$, and is provided in its rear end with a locking device, consisting of the knee-lever $o$, the lower end of which is adapted to lock in the notched stationary rack $p$, against which it is automatically held by means of the spring $q$, one end of which is attached to the lever $m$, and the other end attached to the knee-lever $o$.

R is the detachable toothed plow-point, provided with vertical and horizontal cutting-teeth $r$ $r$ $r$, as and for the purpose set forth.

The colter-wheel in front of the plow is supported in the usual adjustable bearing $s$, secured to the forward end of the frame $a$. Said colter is composed of two parts—viz., a sharp metallic cutting-disk, $t$, for the purpose of cutting the soil in a vertical direction in advance of the plow-point, and a cylindrical wheel, $u$, attached to the side of said cutting-disk, for the purpose of sustaining the weight of the forward end of the plow-frame, as well as to regulate the depth of soil that the plow is to cut.

Having thus fully described the nature, construction, and operation of my invention, I wish to secure by Letters Patent and claim—

1. In a plow, the chain or its equivalent $k$, arranged as shown, for the purpose of securing the mold-board firmly in place to the fulcrum $g$, around which it swings, substantially as set forth, by which the ordinary support from the land-side is dispensed with.

2. A wheel-plow having two supporting-wheels in the same transverse line, one of which is arranged to run in a land-side furrow and the other in an open furrow previously formed, and one or more plows having the long mold-board or mold-boards adapted to extend back and sidewise sufficiently to embrace the entire space between the wheels and to invert the soil behind the furrow-side wheel, substantially as described.

3. In combination with the swinging mold-board H $h$ and its stationary frame $a$, the stationary knife or cutter $i$, as and for the purpose set forth and described.

In testimony that I claim the foregoing as my own invention I have affixed my signature in presence of two witnesses.

THOMAS E. JEFFERSON.

Witnesses:
ALBAN ANDRÉN,
HENRY CHADBOURN.